United States Patent
Ehn, Jr.

(10) Patent No.: US 6,176,084 B1
(45) Date of Patent: Jan. 23, 2001

(54) HYDRAULIC SYSTEM FOR PROPELLING A VEHICLE

(75) Inventor: Byron N. Ehn, Jr., Menomonee Falls, WI (US)

(73) Assignee: Textron Inc., Providence, RI (US)

( * ) Notice: Under 35 U.S.C. 154(b), the term of this patent shall be extended for 0 days.

(21) Appl. No.: 09/240,090

(22) Filed: Jan. 29, 1999

(51) Int. Cl.[7] .................................................. F16D 31/02
(52) U.S. Cl. .............................. 60/427; 60/494; 180/243
(58) Field of Search ........................... 60/427, 484, 494; 180/243

(56) References Cited

U.S. PATENT DOCUMENTS

| | | | |
|---|---|---|---|
| 4,069,886 | 1/1978 | Campbell et al. | 180/44 |
| 4,140,196 | 2/1979 | Brewer | 180/44 |
| 4,244,184 | 1/1981 | Baldavf | 60/420 |
| 4,402,377 | 9/1983 | Brooks et al. | 180/197 |
| 4,484,655 | 11/1984 | Sheppard | 180/308 |
| 4,546,844 | 10/1985 | Stauffer | 180/243 |
| 4,696,367 | * 9/1987 | Delfs | 180/306 |
| 5,199,525 | 4/1993 | Schueler | 180/242 |
| 5,848,664 | * 12/1998 | Kaspar | 180/308 |

* cited by examiner

Primary Examiner—Edward K. Look
Assistant Examiner—Thomas E. Lazo
(74) Attorney, Agent, or Firm—Arthur J. Hansmann

(57) ABSTRACT

A hydraulic system for propelling a vehicle, and with the system arranged with a pump and vehicle drive motors and valves and pilot lines. The operator can select an all-wheel drive or a lesser number of wheel drives. Also, there is a system automatic response to certain conditions of vehicle drive, whereupon the system activates to alter the drive to the various vehicle wheels, including changing from a four-wheel drive mode to a two-wheel drive mode. Further, the operator can override the system's own activation and thereby establish the two-wheel drive mode desired.

15 Claims, 1 Drawing Sheet

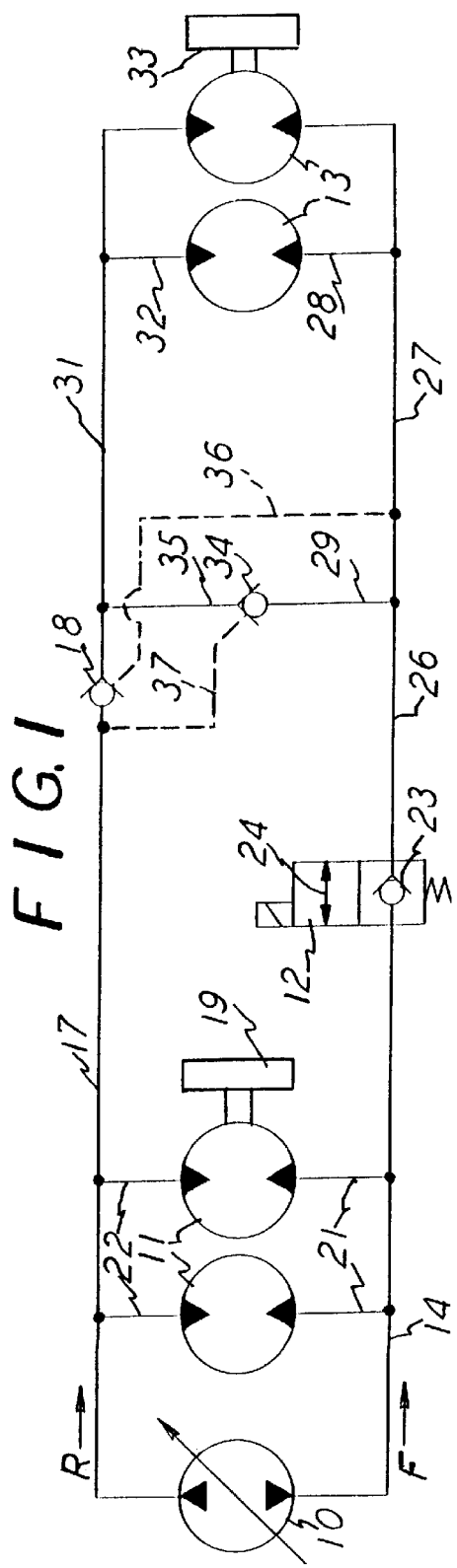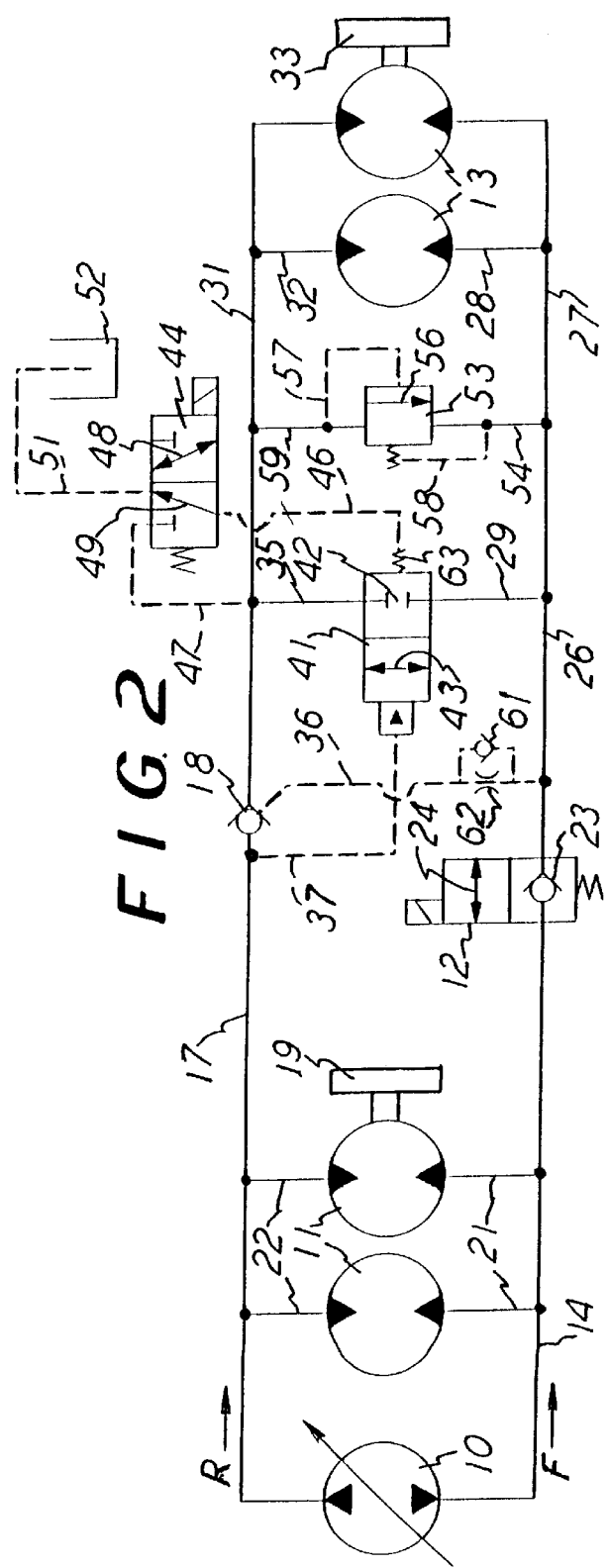

HYDRAULIC SYSTEM FOR PROPELLING A VEHICLE

This invention relates to a hydraulic system for propelling a vehicle, and, more particularly, it relates to a hydraulic system which is both manually and automatically controllable for directing hydraulic fluid to the motors which drive the vehicle wheels.

BACKGROUND OF THE INVENTION

Hydraulic systems for directing hydraulic fluid to motors for driving vehicle wheels have already been established in tractor propulsion, for example. Such prior art is commonly dependent upon manual manipulation of hydraulic valves for directing the hydraulic fluid to the particular motor and in particular conditions of timing and fluid pressure. Those systems utilize hydraulic components which permit forward and reverse drive of the vehicle and which also permit selectivity between driving all of the wheels and also driving only some of the vehicle wheels. In those arrangements, the requirement is that a manually operative valve be employed for the various desired settings to enable the wheel drive selectivity mentioned.

The present invention improves upon the prior art by providing a hydraulic system which is arranged to have both manual and automatic control of the fluid flow in the system for the purpose of forward and reverse propulsion of the vehicle and also for driving all of the wheels and thus controlling movement of the vehicle. In these arrangements, consideration is given to the propelling of the tractor on level ground, and up a hill, and also down a hill, and with all of those three conditions also entailing a forward and reverse drive and in two-wheel and four-wheel drive modes. Under some of those conditions, it is desirable to have the vehicle shift from a four-wheel drive mode to a two-wheel drive mode. Also, it is desirable to have some of the vehicle wheels in a non-powered mode, such as with regard to the rear wheels when the vehicle is moving forwardly down a hill. Again, the prior systems commonly necessitate the inclusion of a manually operated hydraulic valve to disengage the four-wheel drive system in order to achieve the desired mode.

Also, the present invention provides the hydraulic system wherein the manually operated selector valve can be only a two-way and two-position valve, rather than say a three-way and two-position valve heretofore utilized.

The hydraulic system of this invention also has the feature of hydraulically engaging and disengaging the drive to the vehicle rear wheels, and to do so both manually and automatically, as desired. In one refinement of this invention, that is achieved by sensing both hydraulic flow and pressure and this invention thereby determines the proper condition to shift from the four-wheel drive to the two-wheel drive. The system arrangements of this invention are arranged to provide for either manual or automatic selectivity within the system to cause the system to alter from a four-wheel drive mode to a two-wheel drive mode. In the automatic mode, there is no requirement for manual, or even electrical, dis-engagement of the four-wheel drive selector valve, such as by means of a reverse switch on the vehicle traction pedal. In the hydraulic flow controlled system, when traveling forward down a slope, the vehicle rear wheels can actually slip and momentarily spin slightly backwards. This system will sense that reverse flow and automatically shift to the two-wheel drive mode. In these arrangements, the system can actually be adjusted to selective hydraulic pressures which can be slightly lower than the pressure required to cause the rear wheels to start to slip and, as such, it is a system which senses the rear motor hydraulic pressure and rear wheel slip.

The hydraulic system of this invention provides for eight different conditions of operation, namely, the four systems of two-wheel drive traveling forward both up and down a grade and traveling in reverse both up and down a grade; and the four systems of four-wheel drive traveling forward in both the up and down grade and traveling in reverse in both the up and down grade.

BRIEF DESCRIPTION OF THE DRAWINGS

FIG. 1 is a hydraulic schematic view of an arrangement of this invention.

FIG. 2 is a hydraulic schematic view of an arrangement of this invention and is a variation of FIG. 1.

DETAILED DESCRIPTION OF THE INVENTION

FIG. 1 shows a hydraulic system which includes a suitably powered hydraulic pump 10, two vehicle front-wheel drive hydraulic motors 11, a manually controllable hydraulic selector valve 12, two vehicle rear wheel drive hydraulic motors 13, and the hydraulic flow lines shown connecting the aforesaid elements.

It will be understood by one skilled in the art that the hydraulic pump 10 is arranged to be suitably powered by a prime mover on the vehicle, such as an engine, and it is conventionally shown to be a reversible hydraulic pump. A hydraulic fluid flow line 14 extends from one side of the pump 10 and is connected to the selector valve 12. Another hydraulic fluid flow control line 17 is connected to the pump 10 on another side thereof, as shown, and it extends to a check valve 18 in the line 17. It will also be understood by one skilled in the art that the hydraulic motors 11 are suitably connected with the vehicle front wheels, such as represented by the wheel 19.

For that much of the mentioned system, the output of the pump 10 is connected to the line 14 and will cause pressurized fluid to flow through the motors 11 for rotation of the wheels, such as the one shown wheel 19, and that flow will return to the pump 10 through the line 17.

Hydraulic lines 21 are connected between the line 14 and the motors 11, and hydraulic lines 22 are connected between the hydraulic line 17 and the motors 11, as shown.

It can be considered that fluid flow into the line 14 and the lines 21 and through the motors 11 and the lines 22 and back to the pump 10 through the line 17 will produce a forward drive of the vehicle. Conversely, flow from the pump 10 and into the line 17 and the lines 22 and into the motors 11 and into the lines 21 and back to the pump 10 through the line 14 can produce reverse movement of the vehicle. Likewise, and throughout the hydraulic system shown, there are forward drive lines and reverse drive lines, and the letters "F" and "R" indicate those directional modes.

The selector valve 12 is manually controllable, and it has a check valve 23 therein and a flow passageway 24. Therefore, in the FIG. 1 shown position, hydraulic fluid will not flow beyond the valve 12 because it is shown to be in the closed position. When the valve 12 is shifted to where the passageway 24 receives flow from the line 14, that flow is conducted to a line 26 which is connected to the valve 12, and the line 26 extends to a line 27 and to a line 28 which is shown connected with the one rear hydraulic motor 13.

Also, there is a crossover hydraulic line 29 which is connected with the line 26 and extends to connect to a line 31 which is connected with the check valve 18. In turn, line 31 connects with a line 32 which also connects with the motor 13, as do the ends of lines 27 and 31 which connect with the other motor 13 which is shown to be in driving relationship with a vehicle rear-driven wheel 33 of which there would of course be two wheels driven by the respective motors 13, just as with the two front wheels 19.

The crossover lines 29 and 35 have a check valve 34 therebetween. There is a hydraulic pilot line 36 connected to both the main line 27 and the check valve 18. There is a pilot line 37 connected with the main line 17 and with the check valve 34.

In the system shown, it will be seen that the motors 11 and 13 are in parallel connection with the main line as described which form in essence an endless loop, and the parallelism of the rear motors 13 is established by the shown crossover lines at the motors 13. Further, the selector valve 12 is described as being in series connection with the main line which has its extended branches 14, 26, and 27 on that side of the loop, and it has a pump operatively inlet side on the left thereof and a pump operatively outlet side on the right side thereof, as viewed in FIG. 1.

In that system, the line 14 is considered to be the forward drive direction line for the front wheels 19, and the line 17 is considered to be the reverse drive direction line for the front wheels 19.

As mentioned, with this system, there are eight modes of operation.

First, when traveling forward up a grade in two-wheel drive, the pump 10 pressurizes the forward drive line 14 where pressure meets the closed port 23 of valve 12. Consequently, flow can only be through the two front-wheel drive motors 11 while the rear-wheel drive motors 13 push the oil through the check valve 34 in a hydraulic loop formed with the motors 13.

Second, when traveling forward down a grade in two-wheel drive, oil is again flowing in the forward direction but the front motors 11 are forcing oil into the pump 10 and that pressurizes the reverse leg 17 of the circuit. That pressure meets the check valve 18 and terminates there. The rear motors 13 continue to function as mentioned.

Third, when traveling in reverse and up a grade in two-wheel drive, the pump pushes oil into the reverse line 17 and again that oil meets the check valve 18 and is stopped there so it flows only through the front motors 11. However, pressure in line 17 is effective on the check valve 34 through the connecting pilot line 37, and that causes the oil to loop through the connecting lines relative to the rear-wheel drive motors 13 so there is no vehicle drive resistance from the motors 13.

Fourth, when traveling downgrade in reverse in two-wheel drive, the oil is again flowing in the reverse direction and in line 17 but the front motors 11 are forcing oil into the pump pressurizing the line 14 and that hydraulic pressure meets the closed port or check 23, and therefore the flow can only return to the pump 10 for the reverse drive desired. The rear motors 13 tend to suck oil from the reverse leg 31 and thus cause a pressure reduction at the check 18. That leaves a greater pressure in the line 17 and that pressure is presented to the check valve 34 through the connecting pilot line 37. That pressure opens the check valve 34 and allows the oil to loop through the rear motors 13.

Fifth, in the four-wheel drive mode, the selector valve 12 is positioned so that the through passageway 24 connects the lines 14 and 26. Thus, when traveling forward upgrade in that four-wheel drive mode, the pump pushes the oil in the forward direction through the line 14 where it flows through the passageway 24 and into the lines 26 and 27, and flow continues through the rear motors 13 and the line 31 and the check valve 18 and back to the pump 10. That circuit of oil flow meets the closed valve 34 and does not pass therethrough.

Sixth, when traveling forward down a grade in four-wheel drive, oil is still flowing in the forward direction, but the front motors 11 are forcing oil into the pump 10 and thereby pressurizing the reverse line 17 of the circuit. This pressure meets check valves 18 and 34 causing a reversal of flow and closing the check valve 18 while allowing the oil to flow through the check valve 34 and loop through the rear motors 13.

Seventh, while traveling in reverse up a grade and in four-wheel drive, the pump 10 pushes oil in the reverse direction in line 17 and again this oil meets check valve 18 and is stopped there so it flows through the front motors 11. This pressure also acts on pilot line 37 to open check valve 34 and thus allow the oil to loop through the rear motors 31.

Eighth, when traveling in reverse down a grade and in four-wheel drive, oil is still flowing in the reverse direction, but the front motors 11 are forcing oil into the pump 10, pressurizing the forward leg 14 of the circuit. This pressure passes through the open selector valve 12 and is effective on the pilot line 36 to open the check valve 18. The same pressure causes the valve 34 to close, allowing all of the motors to add traction effort to hold the tractor vehicle on the grade or slope.

The variation shown in FIG. 2 with its additional elements which are added to FIG. 1, includes the elements of FIG. 1, and thus the same reference numerals are employed. However, FIG. 2 has some additional hydraulic components, and that arrangement provides for both pressure and flow sensing for the automatic hydraulic system modes described herein.

In place of the valve 34 of FIG. 1, there is a valve 41 which has a closure portion 42 and a passageway 43, and the valve 41 is connected with the pilot line 37, as indicated. Also, there is another four-wheel drive selector valve 44 which is connected to the valve 41 through the lines 35, 46 and 47, as shown, and is also connected to the line 31. The selector valve 44 has a passageway 48 for connecting lines 46 and 47 and 31, when shifted leftwards, and it also has a passageway 49 for connecting the lines 46 and a line 51 which connects with a tank 52, if desired. Again, the valves 18 and 41 sense reverse hydraulic fluid flow, and thus there is the automatic shifting from the four-wheel drive back to the two-wheel drive mode, and that is when the valve 41 has shifted rightward and thereby connect lines 31 and 27. That condition exists when the tractor is moving forward down a grade and until the rear wheels 33 slip and momentarily spins backwards, and then there is the sensing by the valves 18 and 41 of the reverse oil flow and thus there is shifting to the two-wheel drive mode until the tractor is substantially on level ground.

There may also be a relief valve 53 in cross connections 54 and 59 between the lines 27 and 31, and valve 53 has a passageway 56 to communicate line 31 to line 27. Pilot lines 57 and 58 also connect with the crossover lines 54 and 59 and the valve 53.

With the use of the valve 56 which can be set to a hydraulic pressure slightly lower than the pressure required to cause the rear wheel 33 to slip, the valves 18 and 41 sense the reverse flow before the wheels start to slip, and thus there is the automatic shift to two-wheel drive. If the turf conditions are very slick, the system will also act as the flow or rear-wheel slip sensing type, as previously described.

The selector valves 12 and 44 are used to manually shift into a constant two-wheel drive mode. Also, an additional check valve 61 and a flow restriction 62 could be incorporated into the pilot line 36 to tailor the shifting between the two-wheel drive mode and the four-wheel drive mode.

Because of the incorporation of the valves 18 and 41, the system has the feature of allowing the rear wheels 33 to supply traction force while backing down a slope, and it does not require the manual or electric disengagement of the four-wheel selector drive valve 12, such as by means of a reverse switch on the traction pedal.

Throughout this description, the method of operating and controlling the hydraulic system is inherent herein.

With regard to the variation shown in FIG. 2, just as with FIG. 1, there eight modes of operation.

The first mode is considered as when the vehicle is traveling forward up a grade and in two-wheel drive. The pump 10 pushes the oil in the forward direction line 14, and it meets the closed port 23 of the manual selector valve 12. Therefore, pressured oil can flow only through the front-wheel drive motors 11. The passageway 43 of valve 41 is in the open position relative to line 29, and that is due to the static charge pressure that is typical in the closed loop traction circuit of this type. Therefore, oil circulates in the loop having the motors 13 therein, and thus the motors 13 are not being driven for traction drive.

Second, when traveling forward in two-wheel drive and down a grade, the oil is still flowing in the forward direction but the front motors 11 are forcing oil into the pump 10, and that pressurizes the circuit reverse line 17. That pressure is contained by the check valve 18, and the rear motors 13 continue to function as mentioned above.

Third, when traveling in reverse in two-wheel drive up a grade, the pump 10 pushes oil into the reverse line 17 and again it meets the check valve 18, so hydraulic fluid or oil is flowing only through the front motors 11, and again the rear motors continue to recycle as mentioned above.

Fourth, when traveling in reverse in two-wheel drive down a grade, oil is still flowing in the reverse direction in line 17, but the front motors 11 are forcing oil into the pump 10 and thus pressurizing the forward direction line 14 of the circuit. This pressure meets the closed port 23 of valve 12 and therefore can only return to the pump 10 through the motors 11, and the rear motors 13 continue to function as above.

Fifth, when traveling forward in four-wheel drive and up a grade, the pump is pushing oil in the forward line 14 and this oil meets the open port 24 of the valve 12 and flows to the rear motors 13 and to the check valve 18. The pressure in the forward lines 14 and 26 meet the closure 42 of the valve 41 and is stopped there. Valve 41 is in that closed position because valve 44 has been shifted to where its passageway 48 is communicating pressure between the lines 47 and 46 and thus causing the valve 41 to be in the closed position. The forward pressure in line 54 also meets the relief valve 53 which is in the closed position shown in FIG. 2, so the oil is stopped there.

Sixth, when traveling forward in four-wheel drive and down a grade, oil is still flowing in the forward direction in lines 14 and 26, but the front motors 11 are forcing oil into the pump 10 and thus pressurizing the reverse line of the circuit. That hydraulic pressure meets the check valve 18 and passes through, thereby allowing the rear motors 13 to force oil into the pump 10 also. Valve 41 is closed, as shown, because valve 44 is manually shifted leftward and thus there is equal pilot pressure on both sides of valve 41. That condition prevails until the reverse pressure exceeds the pressure setting of relief valve 53, or the rear wheels 33 slip and momentarily spin slightly backwards. In either case, the flow of oil reverses through check valve 18 and thus closes it. Hydraulic pressure is then greater on the left side of valve 18 than it is on the right side, as viewed in FIG. 2. That pressure difference is sensed through the pilot line 37 and also by the valve 41 to place the valve 41 in the open position relative to the lines 29 and 35. That condition allows the oil to loop through the rear motors 13, and thus there is the shifting to the two-wheel drive. That condition or mode continues until the vehicle reaches the bottom of the slope or grade and the pressure across the check valve 18 equalizes and thus closes the valve 41.

Seventh, when traveling in reverse in four-wheel drive up a grade, the pump 10 pushes the oil in the reverse direction, and that oil meets the check valve 18 and is stopped there so it flows through the front motors 11. That pressure also acts on the pilot line 37 for the piloted operated valve 41 and thus opens the valve 41. When valve 44 is manually shifted to the left, the oil can loop through the valve 41 and the rear motors 13, and the valve 41 serves as a bypass relative to the pump 10 so that pressurized fluid from the pump 10 is not presented to the motors 13 for driving purposes.

Eighth, when traveling in reverse in four-wheel drive down a grade, the oil is still flowing in the reverse direction line, but the front motors 11 are forcing oil into the pump 10 and thereby pressurizing the forward direction line 14. That pressure passes through the open valve 12 and is presented to the pilot line 36 of the check valve 18 and thus opens valve 18. Valve 44 has been shifted to where its passageway 48 connects lines 47 and 46 and presents, along with hydraulic pressure through pilot line 37, equal hydraulic pressure on the valve 41, and thus the valve 41 inherently closes with that equal hydraulic pressure on both sides and under the influence of its spring 63, in a conventional arrangement. That mode allows all of the motors 11 and 13 to exert traction effort to thereby hold the vehicle on the slope. The forward pressure also meets the relief valve 53, but it is stopped there.

The restriction orifice 62 and the check valve 61 can be added to the system to thus tailor the shifting between the two-wheel drive and the four-wheel drive modes by further controlling flow through the pilot line 36, as indicated.

In the system of FIG. 2, just as with FIG. 1, the valves 18 and 41 are the essential elements for the system for automatic shifting between the plurality of wheel drives, as provided for and as desired. While the other valves add features, as described herein, they are not essential for the automatic control functions described.

The lines 14, 26, 27, 31, and 17 form the main hydraulic circuit and are disposed in an endless loop. The lines 14, 26, and 27 are considered to be the vehicle forward drive lines and the lines 31 and 17 are considered to be the vehicle reverse drive lines. The pump 10 and the motors 11 and 13 are capable of rotation in both directions of rotation. Of course throughout this description, the lines referred to are conduits suitable for conducting the flow of hydraulic fuild therethrough from and to the conventionally shown connection points on the drawings. The check valve 18 is referred to as the first valve, and the valves 34 and 41 are referred to as the additional valve.

What is claimed is:

1. In a hydraulic system for powering the ground wheels of a vehicle which has a front drive wheel and a rear drive wheel, the improvement comprising:

a main hydraulic flow line disposed in an endless loop and being capable of conducting the flow of hydraulic fluid therethrough, an operatively reversible fluid pump fluid-flow connected to said main line for moving hydraulic fluid through said main line in both directions of flow through said main line, two rotatably reversible hydraulic motors respectively fluid-flow connected in parallel type of connection across said loop for receiving hydraulic fluid from said pump for rotation of said motors in both directions of rotation and with a first one of said motors operatively drivingly connected with said front drive wheel and with a second one of said motors operatively drivingly connected with said rear drive wheel, a hydraulic selector valve fluid-flow connected in a series type connection in said main line for controlling the flow of fluid in said main line and having two fluid-flow operative sides, said motors and said pump and said selector valve being fluid-flow connected in said main line in locations whereby said pump is fluid-flow connected to a first one of said two fluid-flow operative sides of said selector valve and with said second motor being fluid-flow connected to a second one of said two fluid-flow operative sides of said selector valve, a fluid-flow cross-connection line fluid-flow connected with and across said loop in a parallel type connection and being located relative to said selector valve and said second motor to intervene in the fluid flow therebetween and forming a portion of the parallel connection for said second motor, two fluid-flow check valves for checking the flow of fluid from upstream in said line and with a first one thereof fluid-flow connected in said main line and a second one thereof fluid-flow connected in said cross-connection line and with both said check valves being respectively located relative to said second motor to block the flow of fluid to and allow looped circulation through said second motor, and two fluid-flow pilot connection lines fluid-flow connected to said two check valves and with a first one of said pilot lines fluid-flow connected to said first check valve and to said main line at a fluid-flow location between said pump and said second motor and a second one of said pilot lines fluid-flow connected to said second check valve and to said main line at a fluid-flow location upstream relative to the flow-checking side of said first check valve.

2. The hydraulic system for powering the ground wheels of a vehicle which has a front drive wheel and a rear drive wheel, as claimed in claim 1, wherein said selector valve is fluid-flow connected and located in said main line to intervene, relative to fluid flow, between said motors.

3. The hydraulic system for powering the ground wheels of a vehicle which has a front drive wheel and a rear drive wheel, as claimed in claim 2, wherein said selector valve includes a closure arranged to preclude the flow of fluid between said motors, and said selector valve includes a fluid passageway arranged to fluid-flow connect said motors.

4. The hydraulic system for powering the ground wheels of a vehicle which has a front drive wheel and a rear drive wheel, as claimed in claim 3, wherein said check valves are respectively arranged and located in said lines whereby fluid can flow to said second motor when said selector valve is fluid-flow connected with said motors.

5. The hydraulic system for powering the ground wheels of a vehicle which has a front drive wheel and a rear drive wheel, as claimed in claim 4, wherein said pump is directionally rotatable, and said selector valve is arranged to have its said passageway and closure fluid-connected in the system, whereby said pump and said selector valve effect vehicle drive modes selectively forward and reverse, said check valve in said main line is located where said main line receives the flow of fluid from said pump in the reverse vehicle drive mode and is arranged to block the flow of fluid in that reverse mode, and said check valve in said cross-connection line is located where said cross-connection line receives the flow of fluid from said pump in the forward vehicle drive mode and is arranged to block the flow of fluid in that forward mode.

6. In a hydraulic system for traction drive of a vehicle, a main hydraulic line presenting an endless hydraulic flow circuit, a rotatably reversible hydraulic pump fluid-flow connected in said circuit, a first and a second hydraulically powered ground wheel drive motor with each fluid-flow connected in said circuit and with both said motors being fluid-flow connected in parallel in said circuit, a hydraulic selector valve hydraulically connected in said circuit and operatively interposed between said motors for controlling the flow of hydraulic fluid from said pump to said second one of said motors, the improvement comprising:

a first fluid-flow check valve fluid-flow connected in said circuit and operatively interposed between said pump and said second motor and arranged to selectively operatively block fluid flow from said pump to said second motor, a portion of said circuit being located interposed with a connection intermediate said pump and said second motor and with a connection intermediate said first check valve and said second motor and being arranged for bypassing hydraulic flow relative to said pump, a second fluid-flow check valve fluid-flow connected in said portion of said circuit and arranged to selectively operatively block fluid flow in said portion in a first direction of flow to said said second motor, a first hydraulic fluid-flow pilot connection fluid-flow connected with said first check valve and with said circuit at a first location which is between said pump and said second motor, and being arranged for fluid-flow opening of said first check valve in response to fluid pressure in said circuit at said first location, and a second hydraulic fluid-flow pilot connection fluid-flow connected with said second check valve and with said circuit at a second location which is between said pump and said first check valve for fluid-flow opening of said second check valve, in a second direction of flow which is opposite said first direction, in response to fluid pressure in said circuit at said second location.

7. In a hydraulic system for traction drive of a vehicle, a main hydraulic line presenting an endless hydraulic flow circuit, a rotatably reversible hydraulic pump fluid-flow connected in said circuit, a first and a second hydraulically powered ground wheel drive motor with each fluid-flow connected in said circuit and with both said motors being fluid-flow connected in parallel in said circuit, a hydraulic selector valve hydraulically connected in said circuit to be operatively interposed between said motors for controlling the flow of hydraulic fluid from said pump to said second one of said motors, the improvement comprising:

a fluid-flow check valve fluid-flow connected in said circuit and operatively interposed between said pump and said second motor and arranged to operatively block fluid flow from said pump to said second motor, a portion of said circuit being interposed to fluid-flow extend from a location intermediate said selector valve and said second motor to a location intermediate said check valve and said second motor for bypassing hydraulic flow relative to said pump, an additional fluid-flow valve fluid-flow connected in said portion of said circuit and arranged to selectively operatively block the bypassing hydraulic flow relative to said second motor, a first hydraulic fluid-flow pilot connection fluid-flow connected with said check valve and with said circuit at a first site which is intermediate said pump and said second motor, and being arranged for fluid-flow opening of said check valve in response to fluid pressure in said circuit at said first site, and a second hydraulic fluid-flow pilot connection fluid-flow connected with said additional valve and with said circuit at a second site which is intermediate said pump and said check valve for fluid-flow opening of said additional valve in response to fluid pressure in said circuit at said second site.

8. The hydraulic system for traction drive of a vehicle as claimed in claim 7, wherein said additional valve is a pilot operated valve having a shiftable spool including a fluid-flow blockage portion and fluid-flow passage portion and being shiftable between positions of blocking the flow of fluid therethrough and passing the flow of fluid therethrough all in response to fluid pressure applied to said pilot operated valve by said second pilot connection.

9. The hydraulic system for traction drive of a vehicle as claimed in claim 8, including and additional selector valve fluid-flow connected in the circuit and being connected with said pilot operated valve for receiving fluid pressure from said circuit and communicating that pressure to said pilot operated valve to thereby actuate said pilot operated valve to said blockage position.

10. The hydraulic system for traction drive of a vehicle as claimed in claim 7, including a hydraulic pressure sensitive valve connected in said circuit in parallel with said second motor, for sensing fluid pressure in said second motor, and having a fluid passageway to by-pass hydraulic fluid relative to said pump in response to a maximum hydraulic pressure at said second motor.

11. In a method of applying a hydraulic system for the traction drive of a vehicle wherein there are a hydraulic flow circuit and a rotatably reversible hydraulic pump and first and second vehicle drive-wheel hydraulic motors and a hydraulic selector valve in said circuit, and wherein said hydraulic selector valve is hydraulically connected in said circuit to be operatively interposed between said motors and arranged for controlling the flow of hydraulic fluid from said pump to said second one of said motors, and wherein the fluid flow in said circuit is directed in the pattern of an endless loop and includes both a forward and a reverse flow direction for corresponding forward and reverse drive of said vehicle, the improvement comprising the steps of:

checking the flow of fluid in said reverse flow direction by applying system fluid pressure from said reverse flow direction to thereby operatively block the flow of fluid from said pump to said second motor, terminating said checking of the flow of fluid in said reverse flow direction by applying system fluid pressure from said forward flow direction, optionally directing the flow of fluid into a cross-over line extending across said loop at a location which fluid-flow connects between said forward and said reverse flow directions and which bypasses said pump with regard to the hydraulic fluid-flow at said second motor, and controlling the flow of fluid through said cross-over line and doing so by applying system fluid pressure from said reverse flow direction and thereby operatively control the bypassing hydraulic fluid-flow relative to said pump.

12. The method of applying a hydraulic system for the traction drive of a vehicle, as claimed in claim 11, wherein said checking is checked only in the one direction of fluid flow which is from said pump and to said second motor, and said controlling of the flow of fluid through said cross-over line is by checking only in the one direction of fluid flow in said cross-over line which is from said forward flow direction to said reverse flow direction.

13. The method of applying a hydraulic system for the traction drive of a vehicle, as claimed in claim 11, including the step of sensing the fluid pressure in both said forward flow direction and in said reverse flow direction and accordingly bypass said pump with regard to fluid flow relative to said second motor.

14. The method of applying a hydraulic system for the traction drive of a vehicle, as claimed in claim 11, including the step of manually controlling the flow of fluid relative to said cross-over line and effecting the bypassing of the flow of fluid relative to said pump.

15. In a hydraulic system for traction drive of a vehicle having a main hydraulic line presenting an endless hydraulic flow circuit, a rotatably reversible hydraulic pump fluid-flow connected in said circuit, a first and a second hydraulically powered ground wheel drive motor with each fluid-flow connected in parallel in said circuit, a hydraulic selector valve hydraulically connected in said circuit to be operatively interposed between said motors for controlling the flow of hydraulic fluid from said pump to said second one of said motors, said circuit having separate forward and reverse vehicle drive portions for respectively conducting forward and reverse fluid flow in said circuit, the improvement comprising:

said selector valve fluid-flow connected in said forward portion of said circuit, a fluid-flow check valve fluid-flow connected in said reverse vehicle drive portion and operatively interposed between said pump and said second motor and arranged to operatively block fluid flow from said pump to said second motor, an additional portion of said circuit being interposed to fluid-flow extend from a location in said forward portion and intermediate said pump and said second motor to a location in said reverse portion and intermediate said check valve and said second motor for bypassing hydraulic flow relative to said pump, an additional fluid-flow valve fluid-flow connected in said additional portion of said circuit and arranged to selectively operatively block the bypassing hydraulic flow relative to said pump, a first hydraulic fluid-flow pilot connection fluid-flow connected with said check valve and with said circuit at a first site in said forward portion and with said first site being between said pump and said second motor, and with said first pilot connection being arranged for fluid-flow opening of said check valve in response to fluid pressure in said forward portion of said circuit at said first site, and a second hydraulic fluid-flow pilot connection fluid-flow connected with said additional valve and with said circuit at a second site in said reverse portion and with said second site being intermediate said pump and said check valve for fluid-flow opening of said additional valve in response to fluid pressure in said reverse portion of said circuit at said second site.

* * * * *